(12) United States Patent
Jain et al.

(10) Patent No.: US 12,019,490 B2
(45) Date of Patent: Jun. 25, 2024

(54) SYSTEM AND METHOD TO DETECT MALICIOUS CAN CONTROLLER BEHAVIOR FROM ADVERSARIAL CLOCK CONTROL

(71) Applicant: Robert Bosch GmbH, Stuttgart (DE)

(72) Inventors: Shalabh Jain, Pittsburgh, PA (US); Sekar Kulandaivel, Silver Spring, MD (US); Jorge Guajardo Merchan, Pittsburgh, PA (US); Mesbah Uddin, Cupertino, CA (US)

(73) Assignee: Robert Bosch GmbH (DE)

( * ) Notice: Subject to any disclaimer, the term of this patent is extended or adjusted under 35 U.S.C. 154(b) by 464 days.

(21) Appl. No.: 17/135,265

(22) Filed: Dec. 28, 2020

(65) Prior Publication Data

US 2022/0206551 A1 Jun. 30, 2022

(51) Int. Cl.
*G06F 1/28* (2006.01)
*G06F 1/3215* (2019.01)
*H04L 12/40* (2006.01)

(52) U.S. Cl.
CPC .............. *G06F 1/28* (2013.01); *G06F 1/3215* (2013.01); *H04L 12/40026* (2013.01); *H04L 2012/40215* (2013.01)

(58) Field of Classification Search
CPC ........ G06F 1/28; G06F 1/3215; G06F 21/755; G06F 11/3027; G06F 11/3058; H04L 12/40026; H04L 2012/40215; H04L 63/1408; H04L 12/40; H04L 41/142; H04L 41/16; H04L 63/1416; H04L 63/20; H04L 2012/40273; G06K 9/6273; G06N 3/049

See application file for complete search history.

(56) References Cited

U.S. PATENT DOCUMENTS

| | | | |
|---|---|---|---|
| 2013/0347105 A1* | 12/2013 | Neumann | H04W 12/122 726/22 |
| 2015/0113309 A1* | 4/2015 | Grieco | G06F 21/81 713/340 |
| 2017/0286675 A1 | 10/2017 | Shin et al. | |
| 2018/0131712 A1 | 5/2018 | Cornelio et al. | |

(Continued)

OTHER PUBLICATIONS

Kyong-Tak Cho and Kang G. Shin. Viden: Attacker identification on in-vehicle networks. In Proc. 2017 ACM SIGSAC Conference on Computer and Communications Security, pp. 1109-1123, 2017, 15 pages.

(Continued)

*Primary Examiner* — Jaweed A Abbaszadeh
*Assistant Examiner* — Brian J Corcoran
(74) *Attorney, Agent, or Firm* — Dickinson Wright PLLC (57) ABSTRACT

A system comprising a microcontroller located on a communication bus, a power consumption circuit configured to determine power consumption of the microcontroller, wherein a processor is programmed to determine if a clock associated with the microcontroller is paused and whether an average operational power has exceeded a power threshold, and in response to the average operational power exceeding the power threshold and in response to identifying an attacked message or attacked electronics control unit, in response to determining the microcontroller is under the suspected attack, output an alert associated with an event causing change in the bit patterns of messages on the communication bus.

20 Claims, 4 Drawing Sheets

(56) References Cited

U.S. PATENT DOCUMENTS

| | | | |
|---|---|---|---|
| 2019/0245872 A1* | 8/2019 | Shin | H04L 12/40 |
| 2019/0372751 A1 | 12/2019 | Yanamadala et al. | |
| 2020/0067955 A1* | 2/2020 | Hass | H04L 12/4625 |
| 2020/0106221 A1* | 4/2020 | Lee | G06F 1/28 |
| 2020/0387605 A1* | 12/2020 | Gilad | G06F 21/566 |
| 2022/0303287 A1* | 9/2022 | Sloan | H04L 43/022 |

OTHER PUBLICATIONS

Marcel Kneib. A survey on sender identification methodologies for the controller area network. In Delphine Reinhardt, Hanno Langweg, Bernhard C. Witt, and Mathias Fischer, editors, Sicherheit 2020, Sicherheit, Schutz und Zuverlässigkeit, Konferenzband der 10. Jahrestagung des Fachbereichs Sicherheit der Gesellschaft für Informatik e.V. (GI), 17.-20. Mar. 2020, Göttingen, vol. P-301, pp. 91-103, 2020, 13 pages.

Marcel Kneib, Oleg Schell, and Christopher Huth. Easi: Edge-based sender identification on resource constrained platforms for automotive networks. In Proc. 2020 Network and Distributed System Security Symposium (NDSS), Jan. 2020, 16 pages.

* cited by examiner

SYSTEM AND METHOD TO DETECT MALICIOUS CAN CONTROLLER BEHAVIOR FROM ADVERSARIAL CLOCK CONTROL

TECHNICAL FIELD

The present disclosure relates to communication protocols, such as a Controller Area Network (CAN bus) in a vehicle network, aerospace system, industrial system, etc.

BACKGROUND

The CAN bus may be the central communication network in several modern systems such as automotive systems, aerospace systems and industrial systems. The addition of remote interfaces to some nodes on the bus has opened these systems to remote attacks. This has been repeatedly demonstrated for cars by several security researchers. Thus, improving security of the CAN bus has become an important area of research over the past decade.

The original design principles for CAN, and computational capabilities of the typical node on the network significantly increase the difficulty of integrating security into the network. Several techniques have been proposed in literature to address this in the form of novel key agreement mechanisms, lightweight authentication schemes, to using a dedicated Intrusion Detection System (IDS). Several of the proposed mechanisms assume the adversary actions to be restricted to compromising software on the nodes, providing the attacker the ability to inject arbitrary CAN compliant messages. Such assumptions allow optimization of the design of security mechanisms.

CAN peripherals may allow an adversary to utilize existing software interfaces to maliciously inject messages that are not compliant with the CAN protocol. This may include an arbitrary bit injection or insertion of partial (erroneous) messages. Since such attack vectors are relatively new, it may be difficult to detect such adversaries and there are unknown ways to detect them.

SUMMARY

According to one embodiment, a system comprising a microcontroller, a power consumption circuit configured to determine power consumption of the microcontroller, wherein a processor is programmed to determine if a clock associated with the microcontroller is paused and whether an average operational power has exceeded a power threshold, and in response to the average operational power exceeding the power threshold, execute a countermeasure against software associated with an event or hardware associated with an event causing change in the average operational power.

According to one embodiment, a system includes a microcontroller located on a communication bus with a CAN network and a processor in communication with the microcontroller. The processor is programmed to determine a voltage associated with each corresponding bit for each CAN frame, classify a node utilizing the voltage associated with a corresponding bit and CAN frame and record a transmitter associated with the corresponding bit, and in response to voltage associated with a next bit indicating not being associated with the transmitter, output an alert associated with a potential attack on the network.

According to one embodiment, a system includes a microcontroller located on a communication bus, a power consumption circuit configured to determine power consumption of the microcontroller, wherein a processor is programmed to determine if a clock associated with the microcontroller is paused and whether an average operational power has exceeded a power threshold, and in response to the average operational power exceeding the power threshold and in response to identifying an attacked message or attacked electronics control unit, in response to determining the microcontroller is under the suspected attack, output an alert associated with an event causing change in the bit patterns of messages on the communication bus.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In this disclosure, methods and systems are described that can be used to detect such a misuse of the CAN controller as explained below. As such, such detection methods and systems may be required to launch countermeasures to prevent adversarial actions. The disclosure may propose a method to detect the transmission of non CAN-compliant messages that can be used to force nodes on the bus to go in a bus-off state. Thus, the nodes may not be accessible in order to protect from possible threats. There may be several advantages associated with such a method. For one, the method can detect a new class of adversaries that were previously assumed to be impractical for CAN systems. The methods can also be applied at observation points in the networks, including the node being attacked remotely and used to send messages on the CAN bus, or a more powerful central node (e.g., such as the gateway). The proposed methods described below can be used in conjunction with one another to yield a more robust detection mechanism. Such methods may be utilized in a variety of systems that utilize the CAN network, such as vehicle systems, aerospace systems, industrial control systems, building control technologies, etc.

The disclosure may include a security mechanism to defend against remote software based attacks on nodes connected to the Controller Area Network (CAN) bus. The system may assume that attack messages inserted by an adversary adhere to the CAN Data Length Code (DLC) and physical layer specifications, such as in ISO-11898/1 (e.g., or /2, /3). However, based on some proposed attack mechanisms, such an assumption is no longer sufficient for some deployed ECUs. In this disclosure, the system and methods illustrated below can be used to detect malicious packets that can be inserted in a non-compliant manner and be used to disable or shutdown ECUs.

Figure 1:
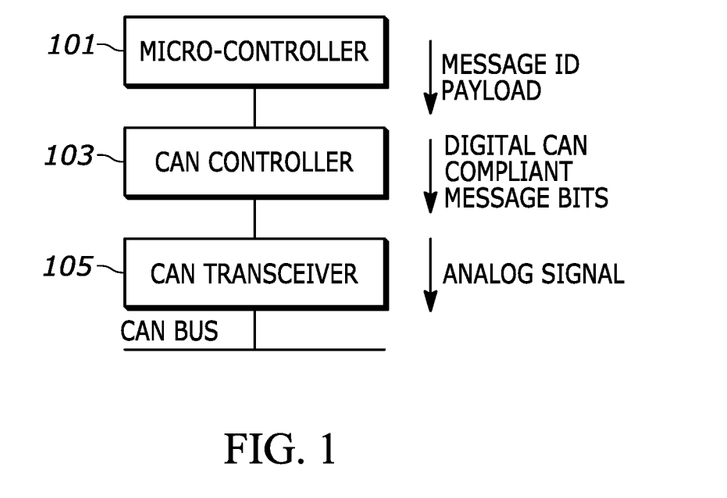
FIG. 1 discloses an illustrative example of a CAN bus.

FIG. 1 is an illustrative example of a CAN bus. The CAN bus may be located in a vehicle network, aerospace system, industrial system, etc. The system may include a microcontroller 101 that operates or controls a specific component, while the CAN controller 103 may handle communication processing for one or more microcontrollers 101. With a traditional layered design, it may be assumed that the interactions between the layers may occur at the messaging interfaces. In the traditional CAN stack, the CAN controller may monitor the bus for transmitted packets and guarantees the compliance of all transmitted messages to the CAN protocol.

The CAN controller 103 may accept data payload and message ID from the application and sends the CAN compliant message frame to a CAN transceiver 105. The CAN transceiver 105 can transmit the analog signal on the bus. The CAN controller 103 may ensure that proper contention resolution operations occurs, such as back-off if arbitration between two simultaneous transmitters is lost, ensuring the transmission of error frames, message ID filtering and maintaining proper inter-frame spacing (IFS).

The CAN controller logic may be implemented in hardware. Hence, it is assumed that adversaries restricted to software manipulation cannot modify the behavior of the CAN controller 103. Thus, the messages transmitted on the bus may be assumed to be CAN compliant.

In several modern ECUs, the CAN controller 103 and the micro-controller (MCU) 101 are part of the same physical package, thus exposing new interfaces to the MCU, namely the clock control and power control. The CAN network may be a two-wire, half duplex, high-speed network system. The CAN network may have advantages to other serial technologies, such as RS232, in regards to functionality and reliability and yet CAN implementations may be more cost effective.

Figure 2:
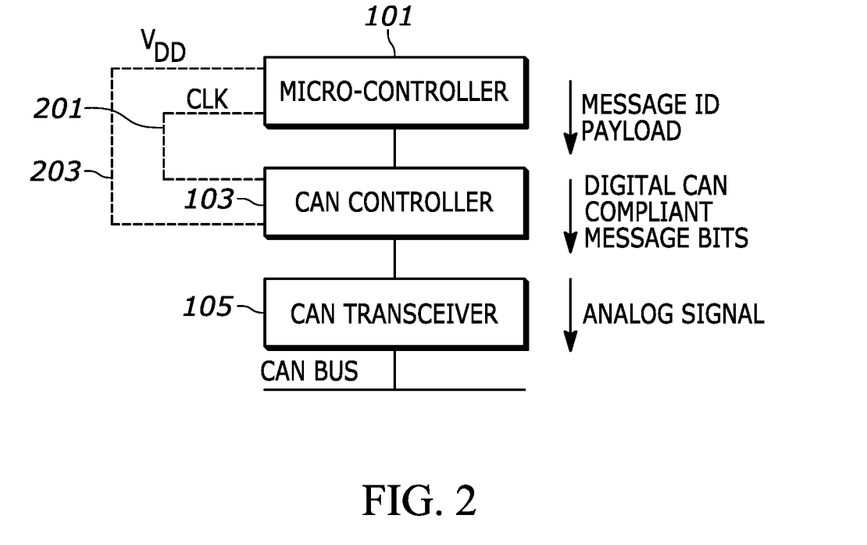
FIG. 2 discloses an additional interface between a CAN Controller and microcontroller.

FIG. 2 illustrates an example of an embodiment that includes an additional interface between a CAN controller and microcontroller. In several modern ECUs, the CAN controller 103 and the micro-controller (MCU) 101 are part of the same physical package, thus exposing new interfaces to the MCU, namely the clock control and power control. The new interfaces, may be (typically) invisible to the application and used by low level device drivers to optimize the power consumption of the chip and during debug operations. However, such interfaces can be utilized by a malicious software to influence the structure of the messages transmitted on the bus. As shown, the MCU 101 and CAN controller 103 may include a voltage supply connection 203 that is maintained from a lead of the transistors that are commonly connected to that supply or to a resistor that connects that supply. Furthermore, a modern CAN controller 203 and MCU 201 may have a clock signal 201 that is produced. The clock signal may oscillate between a high and a low state and utilized to coordinate actions in the circuit. The clock signal may be produced by a clock generator. Based on the new connections, the MCU 101 may utilize the voltage supply connection 203 for various readings on the CAN controller 103. Such variations may be described below.

Figure 3:
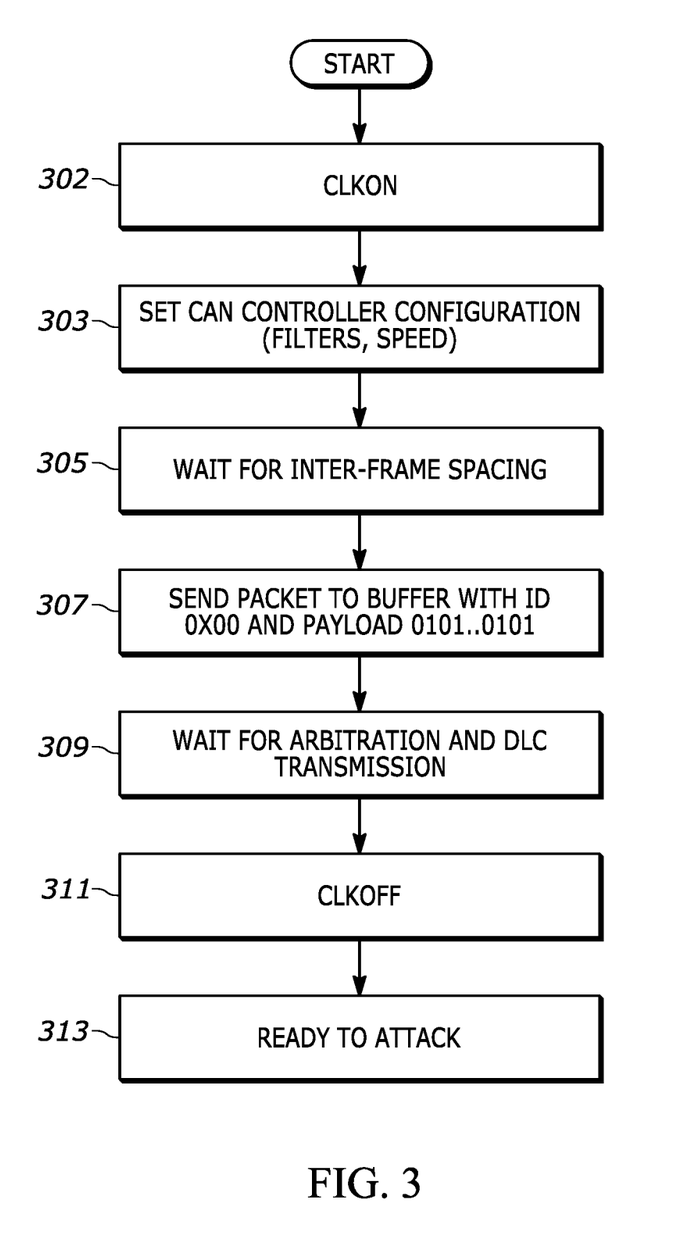
FIG. 3 is an illustrative example flowchart of a CAN controller preparing to launch an attack for arbitrary insertion of bits

FIG. 3 is an illustrative example flowchart of a malicious MCU preparing to launch an attack for arbitrary insertion of bits. As shown in the figures, the operations CLKOFF/CLKON may denote the action of disabling and enabling the peripheral clock (clock gating) to the CAN controller. At step 302, the CLK ON may be activated to enable the peripheral clock (clock gating) to the CAN controller. The CAN controller may ensure that proper contention resolution operations occurs, such as back-off if arbitration between two simultaneous transmitters is lost, ensuring the transmission of error frames, message ID filtering and maintaining proper inter-frame spacing (IFS). At step 303, the MCU may set various settings related to the filters and speed. At step 305, the system may wait for inter-frame spacing. At step 307, the MCU may send packet to buffer with ID) X 00 and a payload 0101 . . . 0101. The attack may utilize a message with ID 0x00 and a 8 byte payload 0101 . . . 01. At step 309, the MCU may wait for arbitration and DLC transmission. The system may assume that attack messages inserted by an adversary adhere to the CAN Data Length Code (DLC) and physical layer specifications, such as in ISO-11898/1 (e.g., or /2, /3). At step 311 the CLK OFF may be activated to disable the peripheral clock (clock gating) to the CAN controller. Thus, the CLKFOFF may disable the peripheral clock to the CAN controller and thus pause the controller state. This may be utilized to transmit a dominant bit.

Figure 4:
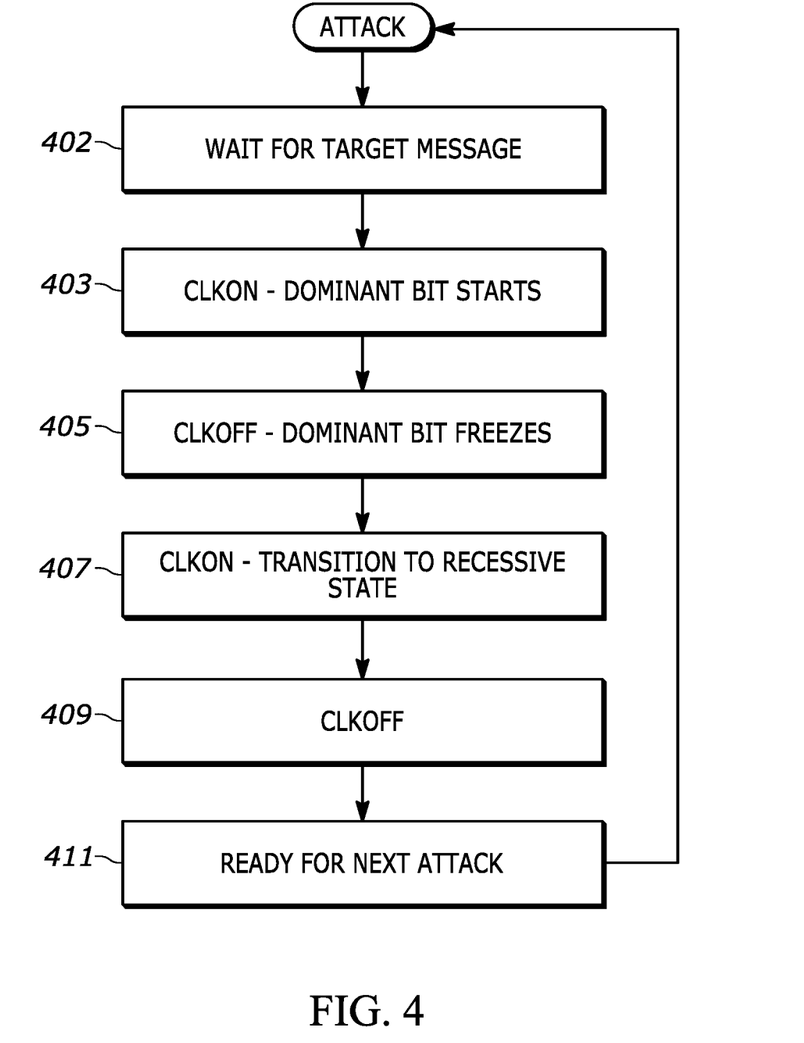
FIG. 4 is an illustration of a method to insert a dominant bit of arbitrary duration by the CAN controller.

FIG. 4 is an illustration of a method 400 to insert a dominant bit of arbitrary duration by the CAN controller. The dominant bit (0 bit) may be of arbitrary length on the CAN bus. As shown in the figures, the operations CLKOFF/CLKON may denote the action of disabling and enabling the peripheral clock (clock gating) to the CAN controller. The implementation details of such an operation may vary with the type of MCU. For example, if using the Arduino Due MCU, it may utilize the low-level command available in the SDK, pmc_disable_periph_clk. Similarly, the methods for measurement of low level timing to synchronize the actions may vary based upon the r different MCUs.

At step 402, the system may wait for a target message. The attack may utilize a message with ID 0x00 and a 8 byte payload 0101 . . . 01. The attack may include two distinct phases. In the first phase, the high-priority message ID is transmitted, causing the CAN controller to go into a state for transmission of the payload. After waiting for transmission of the RTR bit, the command CLKOFF is used to disable the clock, freezing the state of the controller. This may prepare the controller to transmit the message. Upon identification of a target message, the second attack phase may begin.

At step 403, the attack phase may be initiated by using the CLKON command to transmit the first dominant bit of the payload. At step 405, the next step may include disable the peripheral clock of the CAN controller. The CLKOFF command may then be used to freeze the controller dominant state. The disabling of the peripheral clock may last for a desired duration, which may be any type of length. At step 407, the system may cause the controller to transition to the recessive state by successive CLKON and then a CLKOFF signal at step 409, once the dominant state is held for a desired duration. Thus, such a mechanism allows transmission of a single dominant bit of arbitrary duration at the time of attacker's choice. The controlled pausing and release of the CAN controller state machine ensures that it is always ready to transmit the attack bit at step 411.

Such arbitrary insertion of the dominant bits can be utilized to cause a variety of disruptions on the CAN bus. The arbitrary insertion of the dominant bits may be utilized to shut down a remote ECU. This technique may be based on misuse of the error containment mechanism built into the CAN protocol for robustness, to temporarily cause a bus-off in the target ECU. This may cause the target ECU to stop transmitting on the bus for a short period of time.

As a part of the CAN protocol, each ECU maintains error counters. Transmit Error Counters (TEC) and Receive Error Counters (REC) are incremented every time there is an error in the transmission or reception of an error. The transmission behavior of the ECU depends on the value of these counters. In cases when the error counter value for a node exceeds a pre-determined threshold, i.e. there is an indication of an ECU causing too many errors, the ECU removes (isolates) itself from the bus to prevent disruption to the regular bus operation. Such a bus-off remains offline for a pre-determined interval, during which it can then be reset to a good state.

During message transmission, each ECU may read the message bits that the ECU writes on the bus. In cases there is a discrepancy between the written and read bit polarity, the CAN protocol dictates that the ECU may assume the difference is due to an error and immediately transmit an error flag. Simultaneously, it may increment the TEC by 8. Subsequently, each successful transmission of the messages results in decrement of the TEC by 1. Once the error counter reaches 255, the ECU enters the bus-off state.

An adversary capable of inserting dominant bits at arbitrary times can overwrite selective recessive bits in the messages transmitted by the target ECU, resulting in errors and eventually causing bus-off states in the target ECU. Since the payload of a message is typically random, and determined by the transmitter, it may be difficult to predict the position of the recessive bits that are required to be targeted. Thus, in the absence of any bus feedback (as will be the scenario for software attackers), the attackers will have to target known recessive bits that are typically present in the CAN control fields in the message. This, with a high likelihood, the attacker will target the same bit, or a small set bits in each target ECUs messages.

Since the attacker may use clock control to launch the attack, the start and stop times of the attack will be synchronized with the transmission bits. Further, to avoid unnecessary disruption, an attacker may only target a single recessive bit and the following error flag during each attack period. Thus, the attack duration would span a fixed number of CAN bits and start and stop times would be a synchronized to the bit transmissions.

Since the attacker wishes to cause bus-off, it needs cause errors in the target node at a sufficiently high rate such that the TEC reaches 255, without recovering. This will typically result in the adversary targeting successive messages for the target node, or targeting most messages transmitted by a node.

One method of attack may utilize clock gating controls available to the software on an MCU to transmit dominant bits of an arbitrary duration. Furthermore, the attack may lead to malicious activities by using the bit insertion to shut down a critical ECU. This can then be utilized to launch further attacks in response to an ECU (e.g., a critical ECU) being shutdown. Independent of the eventual attack goal, the initial steps that need to be exercised in the CAN network are the clock control for an ECU and ECU shutdown. Several countermeasures can be designed to detect the occurrence of one or both of these conditions by both a local node and a remote node.

One mechanism utilized to detect clock control for an ECU and ECU shutdown may include a power analysis-based detection. One of the key requirements for attacking the CAN controller is the ability to arbitrarily disable the clock and pause the state of the CAN controller during a message transmission. Typically, such clock control mechanisms may be designed in MCUs to reduce power consumption by disabling the clock for peripherals that are not being used. Thus, any adversarial attempt to disable the clock to the CAN controller has a measurable impact on the power drawn by the MCU package. A circuit capable of measuring the power drawn by the MCU package can be used to monitor such deviations and detect a potential CAN attack.

A detection mechanism may perform such power analysis that would be present on any ECUs that may be targeted by a remote adversary and requires several components. A first component may be a circuit to measure the power consumption of the MCU package. The temporal resolution (sampling frequency) and voltage resolution (sensitivity) may need to be sufficient enough to detect variations caused due to the CAN controller. In one illustrative embodiment, for a typical MCU operating at 100 MHz, a sampling rate of 500 MSamp/s may be sufficient. The voltage resolution of 16 bits for a CPU operating at 5V, i.e. resolution of 100 uV may also be efficient.

The system may need multiple profiles for different states of operation in the circuit or MCU. Thus, it may be advantageous to store a set of power profiles that characterize the power consumption of the MCU (or circuit) for different valid states. Such profiles can consist of templates that can be used for comparison during the real-world operation of the chip. Alternatively, this can consist of an artificial neural network such as Multi-layer Perceptron (MLP), Long term short memory (LSTM) network that is trained using time series voltage data from the regular chip operation. Such profiles should additionally characterize the influence of variation of power (on/off) to different peripherals. The training may be done so as to be able to identify correct (alternatively malicious) operation in different environmental conditions (e.g., different temperatures, different tasks, etc.). Alternatively, the function that decides whether the trace corresponds to normal or malicious behavior could accept additional information that allows it to perform different classification based on external parameters such as temperature, humidity, etc.

The system may also require a processor that can utilize the power measurements and compare them to the stored power profiles to classify the current measurement as malicious or valid. The processor can execute an algorithm that can utilize several thresholds depending on the number of valid and invalid power levels that are possible in the MCU. In case the profile is in the form of an artificial neural network, the output of the neural network can be a binary classification (either malicious vs. valid) of the time series voltage data from the bus.

Figure 5:
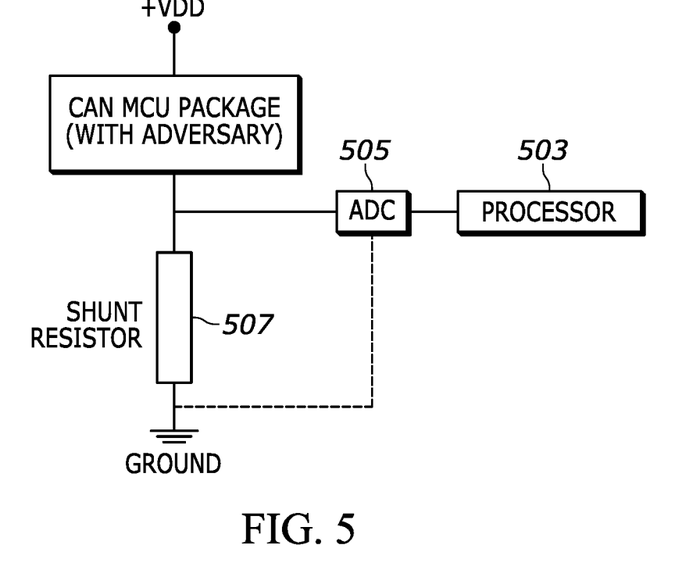
FIG. 5 illustrates an example of monitoring MCU power consumption utilizing a shunt resistor.

FIG. 5 illustrates an example of monitoring MCU power consumption utilizing a shunt resistor. In such an embodiment, an exemplary circuit 500 that includes a shunt resistor 507 inserted in series with the power line may be utilized. To measure the voltage across the shunt resistor 507, such a design can utilize a high resolution (e.g., similar resolution to the embodiment explained above, including (in one non-limiting embodiment) with an ADC with 500 MSamps with a 16-bit resolution). ADC 505 connected to a processor 503 with a sampling rate that is at least several times higher than the bit rate of the CAN transmissions. It should be noted that the ADC 505 and processor 503 (secondary) power source should be sufficiently isolated from the MCU power so that there is no impact on the MCU power profile due to the observations.

To classify the measurement, the algorithm stored on (or accessed by) the processor 503 can utilize one or more thresholds to determine if the clock to the controller is paused. However, one determent to using single static thresholds may lead to high false positives. Thus, the threshold may need to be defined in response to a certain percentage of the average operational power at any time instance. In addition, the algorithm should identify periodic patterns in the variations and correlate them with potential attack scenarios.

For example, an algorithm can be used to classify the measurements. The algorithm may have an assumption that the processor is aware of the CAN bit rate, (e.g., define the length of the CAN bit as Tc). Further, there may be an assumption that the a relative threshold τ has been computed based on experimental analysis.

The processor has a series of voltage measurements at different time samples v(t). The algorithm defines a potentially malicious potentially malicious event e(i)=t if $\tau_L \le |v(t+1)-v(t)| \le \tau_H$, where t is the time value of the voltage observation and $\tau_L$, $\tau_H$ are the thresholds obtained in the power profiles. Such an event definition can be utilized for voltage measurements obtained using a shunt resistor circuit, such as the embodiment depicted in FIG. 5. In alternative implementations, the trigger condition for such events may need to be adjusted in response to the circuit dynamics or MCU operation. For example, the trigger conditions can be adjusted based on a number of applications operating. For example, in an embodiment where the measurement is done using current measurements at an MCU pin, or by probing the electromagnetic radiation from the processor, the trigger condition may be based on the differences in current drawn and EM strength respectively.

In one embodiment, the event may trigger every time the change in voltage is above a certain threshold. However, for most practical scenarios, this may result in a high rate of false triggers. For additional robustness, the events may be alternatively defined as e(i)=(t,{+/−}), e.g., the timestamp with a symbol indicating whether the event was due to an increase or decrease of voltage. In such a setup, if an event is triggered due to an increase of voltage, the event immediately following that must be a decrease event, and vice versa. This may be based on the fact that controller disable and enable operations must happen alternately. Thus all registered events that do not have such a pattern can be discarded as spurious.

The adversary can then measure the time difference between successive events and check to see if that is a multiple of the CAN bit duration, i.e. e(i+1)−e(i)≈kT$_c$, for an integer k. This uses the fact that for a successful attack, the actions of the adversary would be synchronized with the CAN bits and for reliable implementations, it should target the bit at roughly the same time. If the events satisfy such a criteria, they can be flagged as adversarial in nature.

In noisy environments, where there may be multiple spurious events, the criteria for the algorithm can be modified to as e(i+j)−e(i)≈kT$_c$, j∈[1,N$_a$], where N$_a$ is an experimentally determined neighborhood based on the probability of false alarm for the events. Such a criteria assumes the presence of high frequency spurious events, which could be the case in typical noisy automotive environments.

An adversary detector (e.g., detection circuit) could utilize the number of occurrences of the target events in a given duration and compare it to a threshold that is tolerable for error free operation. Typically, for successful use of the attack technique in consideration, it may be beneficial to perform the attack over a short duration. Thus, a high frequency of occurrence of such events can trigger the detector to flag the presence of an adversary.

For adversaries that are willing to extend their attacks over several messages, the comparison duration and threshold can be adjusted based on the number of messages that are typically transmitted on the bus. For example, for a bus where the messages are periodic and 100 messages are transmitted over a 1 second duration, to target an ECU with 125 ms period, the adversary would have to transmit a minimum of 1 attack message every second. Thus the presence of 2-3 events per second could denote adversarial activity. Thus, the threshold could be adjusted to 2-3 per second of message transmissions.

In scenarios where the power profiles are represented by Neural networks, using networks structures with memory, such as Recurrent Neural Networks (RNN) can implicitly handle the timing relation between various events. Thus, such network structures could be suited for application to power-based detection. Simple 2 class classifiers based on RNNs can be trained using operational data to identify malicious events.

In another embodiment, another detection mechanism may be utilized that uses remote monitoring. In such a scenario, rather than utilizing a circuit, an enhanced intrusion detection system operating on the ECU may be utilized. Typically, some IDS solutions operating at the application layer act on received message frames and may be oblivious to error messages, since error messages are not relayed to the application layer. Thus, detection of shutdown-type attacks described here, that utilize error messages, is not possible. The system may include detection methods that can be integrated in such software IDS solutions. However, it is required that the CAN controller used on the ECU running the IDS some capabilities. One capability may be the ability to issue an interrupt (or set a flag), when the error message is received (or equivalently a measurement of error counters). Another capability may be to issue an interrupt (or set a flag), when a Start-of-Frame (SoF) is received. Another capability of the system (e.g., circuit) may be the ability to issue an interrupt (or set a flag), when a frame has been received successfully in the buffer, e.g., previous frame transmission was complete. Another capability of the system may be the ability to receive arbitration ID associated with an error message. Many controllers have such capabilities or at least a subset of such capabilities. Based on the capabilities available in the controller, the system may augment existing IDS rules to detect an adversary.

Such methods may further require that the IDS system maintains a list of messages (IDs and payloads) that are received successfully and do not result in violation of existing IDS rules. Based on the available resources, the scope and size of such a list can be optimized.

There may be scenarios where an arbitration ID associated with an error message is not available. In the presence of an IDS solution, an adversary must perform the attack without violating existing IDS rules, e.g. frequency rule for periodic messages and not flooding messages. Thus, in case the target node goes in the bus-off mode and stops transmitting as a result of the attack, the adversary must insert a message with the expected message ID to compensate with the absence of the target node transmissions. Thus, by observing the message IDs immediately following error, messages can be used as an indicator of target message IDs. To identify such target messages, the network IDS system may perform the following steps:

In a first step, upon receiving the ith error flag $E_f(i)$, the system may track a list of the message IDs that appear immediately following the flag, i.e. $L_i = \{ID_i^1, ID_i^2, \ldots, ID_i^k\}$. The condition is that the priority of $ID_i^j$ should be higher than $ID_i^{j+1}$. This denotes a list of possible IDs that could have resulted in an error, and could be a potential targets by the adversary.

In a second step, for continuing errors, the system may find the common IDs in successive errors, i.e. $R = L_i \cap L_{i+1} \cap \ldots L_m$. Next, the IDs in set R may be being attacked with a high probability. It should be noted that the value of m, e.g., the number of errors considered can be adjusted to ensure that the attack identification is more accurate. With increasing m, the size of R should become smaller, and converge to 1 in the case of a real attack (or an actually faulty transceiver).

In a third step, the eventual ID present in R, e.g., $ID_R$ can be considered either as faulty or being attacked. To determine which of the two cases is true, the IDS system can check the message history to check if other messages from the ECU transmitting $ID_R$ are faulty. If the error is due to an ECU fault, with high probability, other messages from the same ECU may also be faulty. If that is not the case, then the system can conclude with high confidence that the ID is under attack.

In cases where the adversary is aware of the IDS methodology, it can try to avoid the above detection by doing the following actions The adversary can target random IDs in between two attacks on a specific target. In such a case, the intersection considered, as explained in above in the second step, would fail as consecutive errors might not have the same IDs.

The adversary can attack multiple IDs from the same ECU. This, along with violating the intersection as explained in the second step, would also make the IDS believe that the ECU is faulty.

The first scenario, the problem can be alleviated by considering the intersection over arbitrary subsets of $\{L_i, L_{i+1}, L_{i+m}\}$, instead of the continuous subset. In scenarios where the IDS is not computationally limited, a set of all possible subsets can be considered. In practical cases however, several subsets can be selected at random, and be tested. The random selection ensures that the adversary is not able use a fixed pattern of errors to evade the IDS detection.

The second scenario is slightly more challenging. For such a scenario, since multiple IDs are targeted for the same ECU, trying to find message IDs under attack using the approach described here would be difficult. Thus, for such a scenario the IDS should requires a mapping of the message ID to the transmitting ECU, and should use the ECU to track the transmissions, in place of IDs, i.e. have a list of $L_i = \{ECU_i^1, ECU_i^2, \ldots, ECU_i^k\}$ in place of $L_i = \{ID_i^1, ID_i^2, \ldots, ID_i^k\}$, where $ID_i^1$ is transmitted by $ECU_i^1$. This help the IDS identify the potential target ECUs instead of the message IDs. Such a mapping between the ECUs and message IDs can be easily defined in the IDS based on the architecture of the CAN bus.

Next, since multiple messages from the same ECU may be targeted, the method of differentiating between true faults and adversarial actions would not be possible based on mechanism in a third step. Instead, the IDS identifies adversarial messages based on the location of the error. For example, due to the absence of feedback, typically the adversary can only target recessive bits that can be easily predicted by it, i.e. static fields or control fields. However, errors due to a problem in the transmitter are unlikely to be restricted to such fields. Thus, if the adversary observes a pattern of errors in only the static fields, it can conclude the presence of an adversary with a high probability.

As the error frames are discarded by CAN controllers, for a software only IDS, there are no direct methods of observing the field or bit that resulted in an error. Instead, the IDS can estimate the field by observing the time difference between start of frame and error flag. This time can be obtained by measuring the time difference between the SoF flag and the error flag using a local high resolution counter. It should be noted that such a difference will also include the time for stuff bits that are not known to the IDS apriori. Unless the attacker causes the node to go in a bus-off state, the target node retransmits the message. The re-transmission can be used to compute the stuff bits and compute the target segment and bits. In case the node is forced into the bus-off mode by targeting multiple re-transmission messages from a node, the re-transmission cannot be used to obtain the stuff bit count as the adversary may transmit an arbitrary message during the re-transmission. However, rapid increase in receive error counter without the violation of a frequency rule in the IDS can be used as an indication of adversarial action.

Additionally, assume that there is a consistent pattern of bits, $\{b_1, b_2, \ldots, b_e\}$, prior to occurrence of an error, e.g. two dominant bits before the error. In such scenarios, the IDS system can check if there are such patterns present earlier in the erroneous message (or other messages from the same ECU) that do not result in an error. If that is the case, then with a high probability, it can be concluded that the error is the result of an adversarial action. Such bits, similar to the examination of stuff bits, can be done on the basis of re-transmitted messages.

Once a message or ECU has been identified to be under attack with a high probability, the IDS can deploy a decoy frame to measure adversarial reaction. Assuming the target message ID has period T with tolerance $\Delta$, the IDS performs the following The IDS selects a random time instance to deploy the decoy frame.

The IDS waits for the transmission of message ID and records it.

The IDS disables the error-retransmit flag/bit in the CAN controller. This ensures that in case of an error, the IDS does not re-transmit the frame.

At time $T-\Delta$, after the observation of the message ID, the IDS replays the recorded message and monitors the frame for an error.

In case the transmission results in an error, it can be concluded that the error is a result of adversarial actions.

The decoy frame attempts to emulate the real transmitter frame at the expected time instant. An adversary that only has software access cannot determine whether the frame is transmitted as a decoy or by the real ECU without observing it completely. Thus with a high probability, it targets the decoy frame. In the scenario where the adversary does not target consecutive frames, multiple decoy frames can be deployed to be ensure a high probability of being targeted by the adversary.

In scenarios where the arbitration ID associated with an error message is not available, the system may utilize other types of countermeasures to adversarial attacks (e.g., on the clock control). For example, when the arbitration ID associated with an error message can be made available to the IDS software, the methods described above can be modified to identify adversarial actions. Since the message ID is available, the IDS can directly identify potential target nodes. Thus, the system may need to classify whether the error is due to an ECU fault or an adversarial error (e.g., such as an attack).

For each ECU on the CAN bus, the IDS may maintain a shadow TEC (Transmit Error Counter) that is adjusted based on the observation of the error frame and the message IDs. Based on the TEC, various actions may be taken. For example, if the TEC for a tracked ECU reaches 255 (e.g., a bus-off condition), the system may check for a frequency violation in the IDS ruleset for message IDs originating from the target node. If no such violation is detected, the adversary may be impersonating the bus-off node. Thus, the system may program the processor to flag the presence of the message IDs and the target node.

If the TEC is not sufficient to cause a bus-off condition (as described above in the preceding paragraph), then the IDS can utilize the steps outlined above to flag adversarial activity. The IDS can check various interactions in the system. For example, the system can check if a message ID from a specific ECU results in an error. The system may also check if other messages from the same ECU also result in an error. If they do not, with a high likelihood, the system may be programmed that the errors are due to adversarial action, and thus countermeasures may be implemented and the message IDs and nodes may be flagged.

The system may also observe the bit and/or field that causes the error. In case the error for a given message ID is repeatedly caused in a field or location that is not erroneous in other messages from the ECU, the system may be programmed that the error is due to adversarial actions, based on a high confidence.

The system may also be configured to identify the message ID or ECU that has been attacked. Once a message ID or ECU has been identified to be under attack with a high probability, the decoy frame technique described above can be utilized as a potential countermeasure. Of course, other counter measures may be utilized.

In an alternative embodiment, some systems may record the analog CAN signal and perform accurate identification of the transmitter based the observed signal characteristics. CAN fingerprinting methods may rely on the differences in the CAN transceiver characteristics and the propagation network properties between different nodes.

Figure 6:
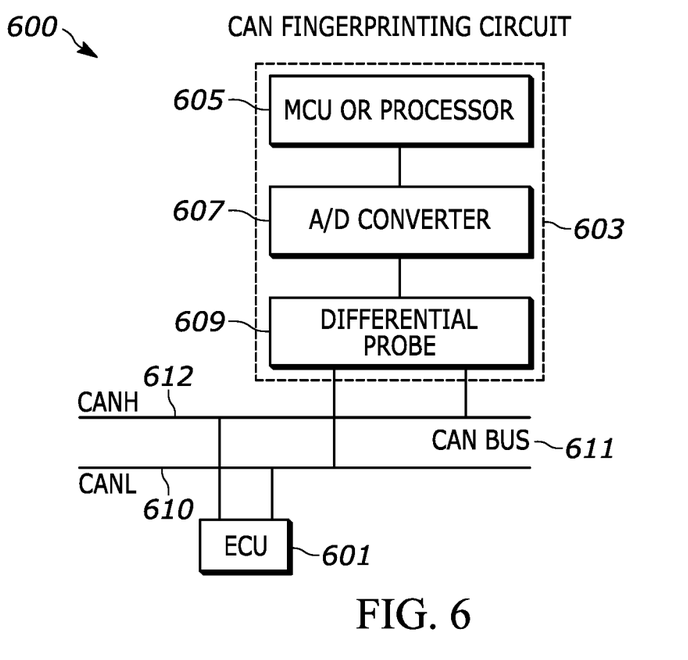
FIG. 6 discloses an illustrative embodiment used to monitor the communication (CAN) bus for fingerprinting ECUS on the communication bus.

FIG. 6 discloses an illustrative embodiment used to monitor the communication (CAN) bus for fingerprinting ECUS on the communication bus. Utilization of such techniques may typically require direct access to the CAN bus 611, using high performance circuits that can digitalize the record the CAN signal. An example of such a configuration using a high resolution ADC is illustrated in FIG. 6. The CAN bus may include two dedicated wires for communication, a CAN high 612 and CAN low 610. When then CAN bus in idle mode, both lines may carry the same voltage (e.g., 2.5V). When data bits are being transmitted, the CAN high line may increase to another voltage (e.g., 3.75 V) and the CAN low may drop voltage (e.g., 1.25V). Thus, there may be a voltage differential (e.g. 2.5V differential). The communication may rely on a voltage differential between the two bus lines. Multiple characteristics of the signal, such as voltage, timing or edge transients are extracted, and used to differentiate between multiple ECUs and identify the transmitting node. Measurements from a differential probe 609 of the CAN fingerprinting circuit 603 may be utilized. Typically, such methods are part of a CAN network intrusion detection system (IDS) 603 to identify potentially malicious transmitters for a frame based on the observation of a full CAN frame. Such a system can be modified to detect the shutdown-type attacks described here based on malicious error frames.

The proposed method utilizes the property that an adversary must overwrite a recessive bit of the target node with a dominant bit to cause an error frame. The system may consider a CAN fingerprinting method (e.g., utilizing the CAN fingerprinting circuit 603) that records the signal properties using a configuration (such as FIG. 6) to create a template for the characteristics of each transmitting node. Such profiles are processed on the unit attached to the observation circuit.

A processor 605 (e.g., one in the CAN fingerprinting circuit 603) may be programmed to observe and store the voltage corresponding to the bits for each CAN frame. The series of measurements for the ith bit in the jth frame may be denoted as $b_{ji}$. The differential probe 609 may be utilized to draw the measurements. The processor 605 may consider that the classifier C that takes as input the series of bit voltage measurements and output the identity of the transmitting node, e.g., $C(b_{ji})$=N, where N denotes a node on the network. Such a classifier can be obtained from several methods.

For an observed error frame, the method to detect whether it is triggered due to malicious activity can determined. The system may consider the error frame to be r bits long (including the error flag) and l be the index of the last dominant bit and k be the smallest index such that all bits between k and l are dominant. Such a set of bits may represent the error flag, the dominant transmissions by the node, and the dominant bit inserted by an adversary to cause the error flag.

In an adversarial scenario, all nodes on the bus except the transmitter will transmit the error flag after violation of the stuff condition by the error flag of the transmitter. Thus, the last 6 bits of the observed frame, i.e. l-5, . . . , l consist of the error flag transmitted by other nodes and yield no information about the adversary.

Consider the identification of the transmitting node based on classification using bits 1, . . . , k-1 to be N. For each bit i, k≤i≤l-6, use the classifier to identify bit $b_i$, i.e. compute $C(b_i)$.

Let $i_0$ be the smallest index such that $C(b_{i0})$ 6=N. Record the transmitter of $b_{i0}$, (say $N_0$) for future reference of the adversary. This represents a potential candidate for the bit inserted by the adversary.

Compute the transmitting node for the next bit, i.e. $C(b_{i0+1})$. This should be the starting point of the error flag that the transmitter sends on the bus. If $C(b_{i0+1})$ 6=$N_0$, it is indicative of the error bit resulting in error to be malicious.

If an existing value of $N_0$ is stored due to an earlier message frame observed on the bus, compare the stored transmitter (potential adversary from the previous frame) to the current value (potential adversary from the current frame). If the values match, then with a high probability, the error is caused due to adversarial actions.

The method described above can be used to identify the presence of a bit transmitted by a node different from the scheduled transmitter, such as an adversary. For each error frame, the confidence level for correct identification of the adversary may depend on the accuracy of the classifier C(•). For the current systems used in practice, the accuracy of the classifiers may be limited to less than 90%. Thus for most practical scenarios, a single error frame would not be sufficient to accurately flag the presence of an adversary. Instead, the system described may utilize multiple error frames. Since typically the adversary will utilize the same node to launch an attack, the identification of a single malicious transmitter in multiple error frames can denote malicious activity with a high probability.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system, comprising:
a microcontroller on a communication bus with a CAN (controller area network) network;
a power consumption circuit configured to determine a voltage associated with each corresponding bit for at least one CAN frame; and
determine an average operational power consumption of the microcontroller based on the voltage with each corresponding bit;
wherein a processor is programmed to determine if a clock associated with the microcontroller is paused and whether the average operational power consumption has exceeded a power threshold when paused,
wherein, if the average operational power exceeds the threshold, determine that the system is under attack; and
in response to determining the system is under attack, output an alert associated with an event causing change in the average operational power.

2. The system of claim 1, wherein the power threshold is a dynamic threshold.

3. The system of claim 1, wherein the power threshold is associated with a certain percentage of the average operational power at any time instance.

4. The system of claim 1, wherein the processor is further programmed to receive one or more power profiles from a set of power profiles, wherein the power profiles indicate power consumption of the microcontroller for various operating states.

5. The system of claim 4, wherein the processor is in communication with a machine learning network trained utilizing time series voltage data.

6. The system of claim 4, wherein the one or more power profiles include information indicative of an influence of variation of power to different peripherals.

7. The system of claim 1, the system includes a shunt resistor, wherein the processor is programmed to measure voltage across the shunt resistor.

8. The system of claim 1, wherein the processor is further programmed to identify periodic patterns in the power threshold.

9. The system of claim 1, wherein the alert includes a bit transmitted on a communication bus.

10. The system of claim 1, wherein the power threshold is responsive to external parameters that include at least temperature information or humidity information.

11. A system comprising:
a microcontroller located on a communication bus with a CAN (controller area network) network; and
a processor in communication with the microcontroller, wherein the processor is programmed to:
determine a voltage associated with each corresponding bit for each CAN frame;
classify a node as malicious or valid utilizing the voltage associated with a corresponding bit and CAN frame and record a transmitter associated with the corresponding bit; and
in response to voltage associated with a next bit indicating not being associated with the transmitter, output an alert associated with a potential attack on the network.

12. The system of claim 11, wherein the system further includes an analog to digital converter in communication with the microcontroller.

13. The system of claim 11, wherein the system further includes a differential probe in communication with the microcontroller, wherein the differential probe is configured to measure the voltage associated with each corresponding bit utilizing measurements from a CAN high wire and a CAN low wire.

14. The system of claim 11, wherein the processor is further programmed to determine signal timing associated with each corresponding bit for each CAN frame.

15. The system of claim 11, wherein the processor is further programmed to compare a voltage value of an earlier message frame compared to voltage associated with a stored transmitter to determine if an adversarial attack is occurring.

16. The system of claim 11, wherein the processor is further programmed to utilize multiple error frames associated with a malicious transmitter.

17. The system of claim 11, wherein the processor is a remote processor configured to monitor the communication bus.

18. A system comprising:
a microcontroller located on a communication bus; and
a processor in communication with the microcontroller, wherein the processor is programmed to determine if the microcontroller is under a suspected attack based on a voltage associated with each corresponding bit for each CAN frame and bit patterns of messages on the communication bus; and
in response to determining the microcontroller is under the suspected attack utilizing the voltage and bit patterns, output an alert associated with an event causing change in the bit patterns of messages on the communication bus.

19. The system of claim 18, wherein the alert includes at least a decoy frame output on the communication bus at a random time instance.

20. The system of claim 18, wherein the processor is further programmed to:
wait for a transmission of a message identifier and record the transmission of the message identifier;
disable an error-retransmit flag or error-retransmit bit in the microcontroller;
in response to exceeding a threshold time period, replay the recorded message identifier and monitor a frame for errors; and
determine if the transmission results in an error.

* * * * *